United States Patent
Colman et al.

[15] 3,646,753
[45] Mar. 7, 1972

[54] ENGINE COMPRESSOR BLEED CONTROL SYSTEM

[72] Inventors: Michael E. Colman, Manchester, Conn.; Charles F. Stearns, East Longmeadow, Mass.

[73] Assignee: United Aircraft Corporation, East Hartford, Conn.

[22] Filed: Apr. 28, 1970

[21] Appl. No.: 32,688

[52] U.S. Cl. ............................................. 60/39.27, 60/39.29
[51] Int. Cl. ......................... F02c 9/14, F02k 5/00, F02c 9/04
[58] Field of Search .......................... 60/39.27, 39.29, 39.26

[56] References Cited

UNITED STATES PATENTS

| | | | |
|---|---|---|---|
| 2,978,166 | 4/1961 | Hahn | 60/39.29 |
| 3,006,145 | 10/1961 | Sobey | 60/39.29 |
| 3,172,259 | 3/1965 | North | 60/39.29 |
| 3,513,899 | 5/1970 | Padvch | 60/39.29 |
| 3,166,989 | 1/1965 | Cowles | 60/39.29 |

Primary Examiner—Mark M. Newman
Attorney—Norman Friedland

[57] ABSTRACT

Control means for a compressor bleed for a turbine-type of power plant judiciously schedules the opening and closing thereof in accordance with a predetermined schedule while also assuring that the acceleration and deceleration limits controlled by the fuel control are not reached until the bleeds are in the full open position.

10 Claims, 3 Drawing Figures

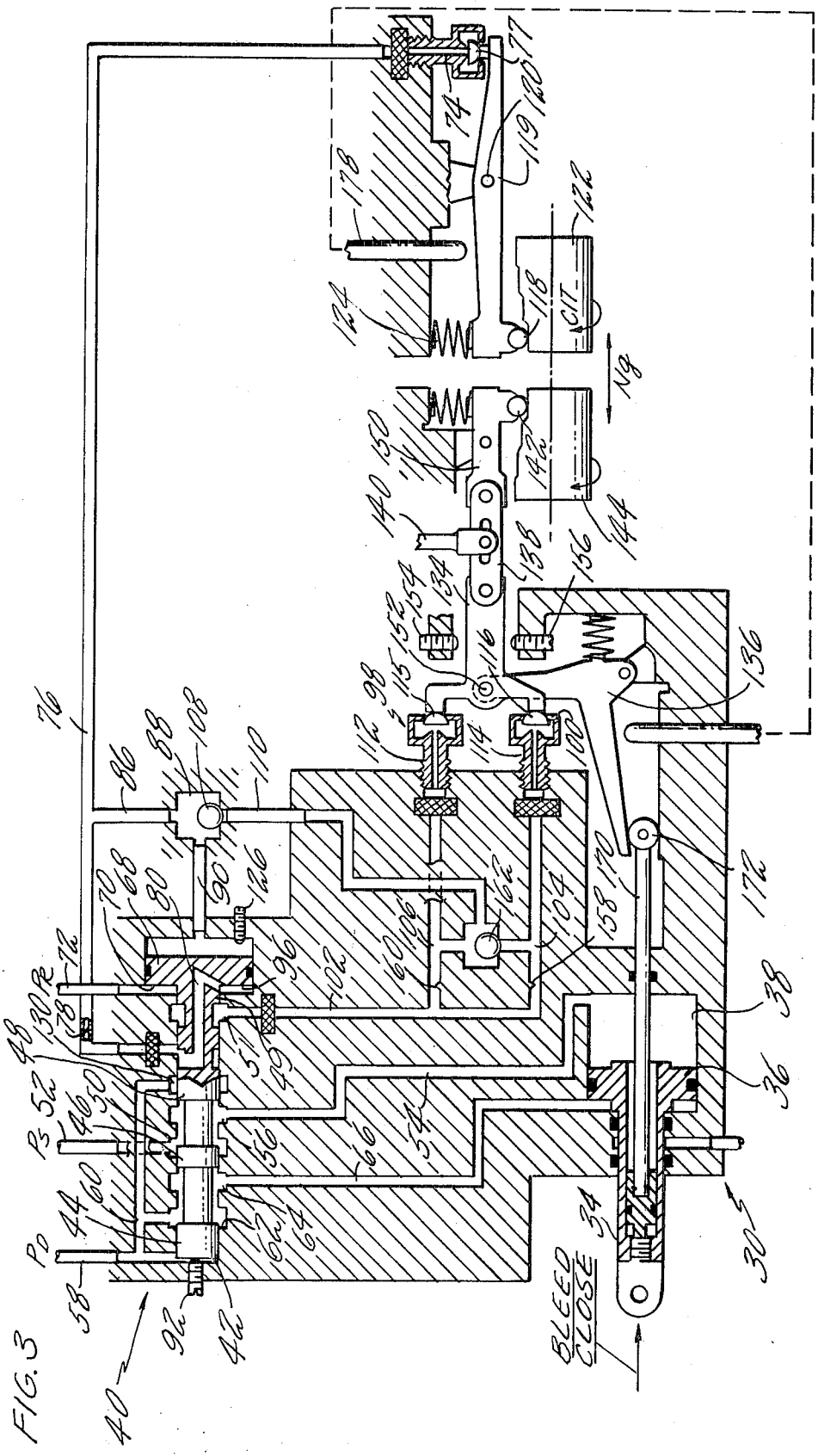

ENGINE COMPRESSOR BLEED CONTROL SYSTEM

BACKGROUND OF THE INVENTION

This invention relates to mechanism for controlling the opening and closing of a compressor bleed valve for a turbine-type power plant in a predetermined manner while assuring that the acceleration and deceleration limits are not reached before the opening of the bleed valve.

It is customary to provide in a turbine-type power plant, compressor bleed valve which heretofore serve to bleed compressor discharge air during certain operating regimes of the power plant. Generally such controls are operated during takeoff while the engine is accelerating and are turned off when a predetermined condition is met. Thus above a predetermined point the compressor bleeds are maintained closed at all times and below a predetermined point they are held open.

The purpose of this invention is to schedule the bleed in such a way that below a predetermined corrected speed and above a higher predetermined corrected speed the bleed valves are opened and closed respectively. Intermediate the two corrected speed points, the bleed valves are opened or closed depending on whether the engine is operating above or below a predetermined percentage of the steady-state engine operating line. In addition, the control assures that the fuel control does not allow the engine to operate at the acceleration or deceleration schedule prior to opening the engine bleed valve.

SUMMARY OF INVENTION

A primary object of the present invention is to provide improved means for scheduling the opening and closing of a compressor bleed valve for a turbine type of power plant.

A feature of this invention is to open the compressor bleed valves below a predetermined corrected speed condition of the compressor, close the bleed valve above a higher predetermined corrected speed and to open and close the bleed valves between said two predetermined speeds when the engine is operating above and below a predetermined percent of the engine steady-state operating line. The opening and closing of the bleeds during an acceleration or deceleration as described in the above will allow faster engine accelerations or decelerations.

A still further object of this invention is to assure that the fuel control does not allow the engine to operate on the acceleration and deceleration lines before the engine bleeds are in the opened position.

Other features and advantages will be apparent from the specification and claims and from the accompanying drawings which illustrate an embodiment of the invention.

BRIEF DESCRIPTION OF THE DRAWINGS

FIG. 3 is a schematic illustration, partly in section, illustrating the preferred embodiment of this invention.

DESCRIPTION OF THE PREFERRED EMBODIMENT

Figure 1:
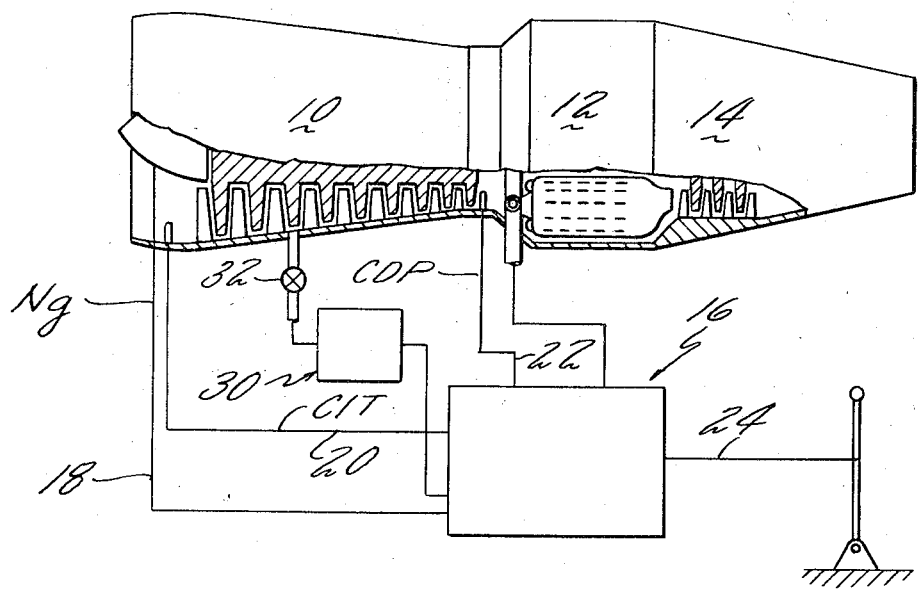
FIG. 1 is a schematic illustration of a preferred embodiment.

Reference is hereby made to FIG. 1 which shows a turbine-type power plant comprising a compressor section generally illustrated by numeral 10, burner section generally illustrated by numeral 12 and a turbine section generally illustrated by numeral 14. The fuel control generally illustrated by numeral 16 serves to meter the proper amount of fuel necessary to operate the engine within the envelope or confines of the acceleration and deceleration lines shown in FIG. 2 and holding the engine on the steady-state line when the engine is operating at the steady-state condition so as to assure optimum fuel economy, prevent surge, rich and lean blowout. A suitable fuel control is described and claimed in U.S. Pat. No. 2,822,666 granted to S. G. Best on Feb. 11, 1958, which is hereby incorporated by reference.

As is well known the fuel control monitors a plurality of engine operating parameters as for example compressor speed ($N_G$), compressor inlet temperature (CIT), compressor discharge pressure (CDP), and power lever position all of which are schematically illustrated by dash lines 18, 20, 22, and 24 respectively, to compute the proper amount of fuel to be metered to the burner section. As is well known in the art the fuel control instead of sensing compressor discharge pressure may as a substitute sense compressor inlet pressure which merely changes the slopes of the operating curves for a particular type of engine. As the case may be, suffice it to say that the fuel control senses compressor speed and power lever position to produce a speed error signal for producing a signal indicative of $W_f/P$ for controlling the steady-state operation of the engine, senses compressor inlet temperature and speed for producing another signal indicative of $W_f/P$ for the acceleration and deceleration limits and multiplies this signal by actual compressor discharge pressure or compressor inlet pressure. As the operation of the fuel control is not deemed a part of this invention, the details have been omitted herefrom for the sake of convenience and simplicity but it is to be understood, as it will be more apparent from the description to follow that speed error signal $W_f/P$ is applied as an input to the bleed control mechanism for controlling the bleed actuator. Thus, to implement existing fuel controls all that is necessary to accommodate the present invention is to utilize the position of the multiplication rollers as an input signal. Therefore, for the purpose of this invention it is only necessary to appreciate that the roller position of the fuel control disclosed in U.S. Pat. No. 2,822,666 in an indication of the $W_f/P$ parameter.

Figure 2:
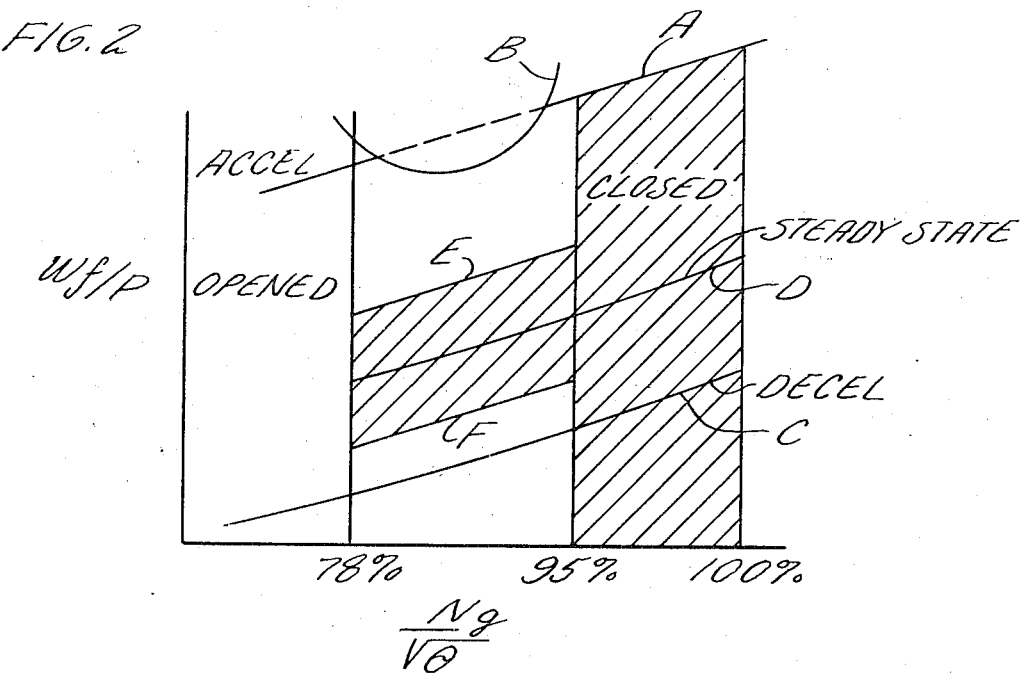
FIG. 2 is a graphical representation of scheduling mechanism of the present invention.

Referring to the graph shown in FIG. 2, the acceleration schedule and the deceleration schedule which as shown for one temperature condition comprise curve A which represents the maximum temperature line, curve B which represents the point above which compressor surge will ensue, and curve C represents the deceleration schedule line. Curve D represents the steady-state engine operating line and the shaded area in the graph represents that portion where it is desirable to schedule the bleeds in the closed position and the unshaded portions represent the portion where it is desirable to schedule the bleeds in the opened position. It is apparent from the foregoing, that the fuel control serves to assure that the engine is operating on a steady-state line during steady-state operation and that it is operating within the limits during acceleration and deceleration.

As can be seen from FIG. 2 the bleeds are required open between 0 percent and 78 percent of corrected speed $N/\sqrt{\theta}$ and closed between 95 percent and 100 percent $N/\sqrt{\theta}$. Between 78 percent and 95 percent the bleeds are either opened or closed depending on how far the demanded engine conditions are away from the actual steady-state line. As noted, above and below lines E and F the bleeds are in the opened position and between lines E and F the bleeds are in the closed position. As will be appreciated from the description to follow, these conditions are obtainable by the mechanisms which will be described hereinbelow.

Referring now to FIG. 1, bleed actuator generally illustrated by numeral 30 serves to move the engine bleed valves 32 (only one being shown) to the opened and closed position. The engine bleed valve may take any suitable form of bleeds as for example the type shown and disclosed in U.S. Pat. No. 3,057,541 granted on Oct. 9, 1962 to A. Hasbrouck et al. and entitled "Circumferential Bleed Valve."

Reference is now made to FIG. 3 showing the details of the invention in which connecting rod 34 of actuator 30 is positioned by piston 36 which is disposed in cavity 38. Pilot valve generally illustrated by numeral 40 serves to apply high and low pressure to either side of piston 36 in order to effectuate movement either to the bleeds-opened or to the bleeds-closed direction. Pilot valve 40 comprises spool 42 consisting of lands 44, 46 and 48 serving to intercommunicate the various ports for controlling the flow into and out of the cavity portion 38 of the actuator 30. As shown in the drawing, supply pressure ($P_S$) from a pressure supply source (not shown) is admitted into annulus 50 via line 52 and directed into cavity 38 to act on the right-hand side of piston 36 via line 54 and annulus 56. The other end of piston 36 communicates with drain pressure ($P_D$) evidenced in drain line 58 via branch line 60, annular port 62, annular port 64 and line 66. Spool 42 is actuated by the half area servo piston 68 which has one end 70 continuously subjected to regulated pressure ($P_R$) which is admitted thereto via line 72. Preferably, a suitable pressure regulator (not shown) would be utilized to maintain the ($P_R$) pressure at a constant value. This regulated pressure is fed to the flapper valve generally illustrated by reference numeral 74 via line 76, fixed restriction 78 and drilled passage 80. When the orifice at the end of line 76 which is controlled by flapper 77 is in the closed position as shown in FIG. 3, no pressure drop across restriction 78 will be evidenced and the upstream pressure applied to the right-hand side of piston 68 via branch line 86, selector valve 88 and line 90 equals $P_R$ supply pressure. Since the area of piston 68 on the right-hand side is twice the area of the piston on the left-hand side, valve 42 will be moved to the full left position against the fixed adjustable stop 92. When the spool valve and the actuator are in the position shown in FIG. 3, the bleeds are held in the opened position. In this position land 49 of spool 42 is to the right of annular port 51 blocking off communication between chamber 96 which is in communication with regulated pressure admitted thereto through line 72. This serves to disarm flapper valves 98 and 100 which are in communication thereto via line 102 and branch lines 104 and 106. Also it will be appreciated that ball 108 of selector valve 88 seats against the end of line 110 so that no flow will be evidenced therein. Nozzles 112 and 114 are controlled by flapper valves 115 and 116 respectively, each of which control the curtain area or the distance between the end of the nozzle and the working surface of the respective flapper valves. The operation of the flapper valves will be described hereinbelow.

As noted, follower 118 carried by fulcrumed lever 119 pivotally connected to pivot 120 is adjusted by three-dimensional cam 122 which is moved rectilinearly as a function of speed and is rotated as a function of compressor inlet temperature. For more detail of three-dimensional cams reference is hereby made to U.S. Pat. No. 2,822,666, supra. The profile of the cam is therefore contoured so as to provide a signal indicative of corrected speed. The follower 118 which is spring biased to follow the contour of the cam by spring 124 controls the position of flapper 77 so that when the follower is on a higher radius of cam 122, follower arm 118 rotates in a clockwise direction opening flapper 77 causing servo fluid to egress from line 76 and thus increases the pressure drop across restrictor 78. The now lower pressure in line 76 is felt behind piston 68 via selector valve 88 and line 90 and the higher pressure acting in chamber 70 urges the spool to the right against adjustable stop 126. This serves to communicate the left-hand side of piston 36 with high pressure and the right-hand side of piston 36 to lower pressure and urges piston 36 to the right for moving the actuator bleed to the closed position. Obviously, with lands 44 and 46 moved to the right, drain line 60 is blocked from line 66 and supply pressure in line 52 flows to the left of land 46 into line 66 while opening drain lines 60 to line 54 via annuli 130 and 56. Regulated pressure in line 72 is therefore placed in communication with line 102 via land 49 and annulus 51 for arming flappers 98 and 100.

From the foregoing it is apparent that the bleed is moved from the opened position to the closed position when follower 118 is raised a predetermined amount by cam 122. Since cam 122 is adjusted by corrected speed, the bleed therefore is closed at a predetermined corrected speed, say 78 percent. It is also apparent that flappers 115 and 116 are armed at this point and these flappers which are held away from the respective nozzles 112 and 114 by the impact of the flow of fluid discharging therefrom are controlled by the generally T-shaped bar 134.

T-bar 134 at one end is pivotally attached to bellcrank 136 and on the other end is pivotally attached to link 138. Link 138 is connected to lever 140 which is controlled as a function of $W_f/P$ produced by the fuel control as was described hereinabove. Follower 142 which is controlled by cam 144 which may be connected to a common shaft connecting cam 122 is moved as a function of compressor speed and compressor inlet temperature. This combined signal is transmitted to link 138 via the fulcrumed lever 150.

It is apparent from the foregoing that T-bar 134 will rotate about pivot 152 whenever link 138 is displaced horizontally. Thus, whenever lever 140 does not agree with the position of follower 142, that is, if the $W_f/P$ signal does not agree with the signal produced by three-dimensional cam 144, T-bar 134 will be displaced horizontally against either adjustable stop 154 or 156 depending whether the signal departs from above or below the steady-state line. In either event the rotation of T-bar 134 will close off one of the flappers 115 or 116, thus reducing the pressure drop across either fixed restriction 158 or 160. Selector 162 will select the higher of the two pressures in lines 104 or 106 and transmit this signal via line 110 into line 90 to act against piston 68 which, in turn, will move spool 42 to the left. This causes the lands on spool 42 to reverse the connections in lines 54 and 66 acting across piston 36 so as to connect the one connected to drain pressure to supply pressure and the other which was previously connected to supply pressure to drain pressure for positioning actuator 34 to the open position as shown in FIG. 3. Thus, at some given percent above and below the steady-state line the actuator will cause the bleeds to go open within, say the 78 percent to 95 percent corrected speed range.

In order to assure that the fuel control does not reach the acceleration line before the compressor bleed actuator is opened, a positioned feedback is employed. Connecting rod 170 serves this purpose by imparting actuation motion to the T-bar. Roller 172 carried by connecting rod 170 bears against the inclined arm of bellcrank 136 which carries the floating pivot 152 for positioning it rectilinearly. When actuator 30 is in the closed-bleed position, T-bar 136 is at a small gap from control flappers 115 and 116 which gap is determined by the percent distance that lines E and F of FIG. 2 are from the steady-state line. As noted above, when T-bar lever 136 is angled as a result of a disagreement of $W_f/P$ and three-dimensional cam 144 (an off-steady-state condition) either flapper 115 or 116 is in the closed position. As was mentioned previously, pilot valve 42 was positioned against stop 92 for causing the compressor bleed valves to move open. As the compressor bleed actuator 34 moves to the open position, roller 172 carried by connecting rod 170 translating along the angled surface of bellcrank 136 causes the floating pivot point 152 to recede from the flappers 115 and 116. This motion, in turn, allows T-bar 134 to angle even more than was the case occurred by the action of the lever 140 and three-dimensional cam 144. The T-bar lever motion corresponds to allowing the fuel control to go to the acceleration limit, thus assuring that the fuel control tracts the compressor bleed actuator to the acceleration limit or deceleration limit and assuring the compressor bleeds are open before the limits are reached.

Above the 95 percent corrected speed the schedule demands that the bleeds always be closed. Consequently, any off steady-state angulation of T-bar lever 136 must not actuate the flapper valves 115 and 116. To accomplish this another cam rise is provided on three-dimensional cam 122 corresponding to the 95 percent corrected speed. At this point, namely, the extreme right position of three-dimensional cam 122, lever 119 is urged upwardly to engage plunger 178 which as schematically shown engages the inclined arm of bellcrank 136, rotating it in a clockwise direction moving floating pivot 152 to the right. This assures that the flappers 115 and 116 are rendered inoperative.

As noted when lever 119 is rotated clockwise about pivot 120 it moves flapper 77 away from nozzle 74 increasing the pressure drop across restrictor 78 for lowering the pressure acting on the right-hand side of piston 68 causing it to move to the right against stop 126. This connects line 66 to servo pressure and line 54 to drain pressure causing piston 36 to move to the right and hence, actuator 30 to move to the bleeds-closed position.

It should be understood that the invention is not limited to the particular embodiments shown and described herein, but that various changes and modifications may be made without departing from the spirit or scope of this novel concept as defined by the following claims.

We claim:

1. A control for opening and closing compressor bleeds for a turbine type of power plant having a compressor, a fuel control regulating the flow of fuel to schedule the steady-state, acceleration and deceleration power plant operating conditions,
   a power lever, which activates said fuel control,
   an actuator for positioning said bleeds to an opened and a closed position,
   means responsive to power plant rotational speed to control said actuator so as to open said bleeds between a first predetermined range of rotational speeds and to close said bleeds above a higher predetermined range of rotational speeds,
   and means responsive to a condition of the fuel control for controlling said actuator to close said bleeds at a predetermined percentage from said steady-state operating condition between said predetermined ranges of rotational speed and means responsive to changes in power lever position, which position would cause fuel flows placing the power plant in a limited acceleration or deceleration mode, operating said bleed actuator to open said bleed between said predetermined ranges of rotational speed before said acceleration and deceleration power plant operating limits controlled by said fuel control are reached and permitted the fuel control to place the power plant in its full acceleration and deceleration mode so as to reach such limits established by said fuel control.

2. A control for opening and closing compressor bleeds as claimed in claim 1 wherein said means responsive to power plant rotational speed is also responsive to compressor inlet temperature of said power plant.

3. A control for opening and closing compressor bleeds as claimed in claim 2 wherein said rotational responsive means includes a hydraulically operated pilot valve, a servo pressure and a drain pressure, and fluid connection interconnection said pilot valve for applying drain and servo pressure to said actuator to control the movement thereof.

4. A control as claimed in claim 3 where a half area servo piston is operatively connected to said pilot valve, a regulated pressure continuously applied to one side of said half area servo piston, and means for controlling the pressure on the other side of said half area servo piston so as to position said pilot valve rectilinearly.

5. A control as claimed in claim 4 wherein said means responsive to said power plant rotational speed and compressor inlet temperature includes a three-dimensional cam.

6. A control as claimed in claim 5 wherein said means responsive to a fuel control condition includes a pair of hydraulically parallelly connected valve means and a mechanical connector for selectively actuating one or the other of said pair of valve means for further controlling the pressure on the other side of said half area servo piston.

7. A control as claimed in claim 6 wherein said pilot valve includes means for arming and disarming said parallelly connected valve means by admitting servo pressure to or blocking off servo pressure from said parallelly connected valve means to render said parallelly connected valve means operative and inoperative at predetermined ranges of rotational speed.

8. A control as claimed in claim 7 including linkage means interconnecting said parallelly spaced valve means and said three-dimensional cam, and said linkage means includes a T-shaped lever rotatably secured to a pivot having one leg of said T-shaped lever positioning one of said valve means and another leg positioning the other valve means.

9. A control as claimed in claim 8 wherein said actuator includes a piston element, feedback means interconnecting said piston element and said T-shaped lever for positioning said pivot.

10. A control system for actuating bleeds adapted to remove air from the compressor section of a jet engine wherein a fuel control in response to a $W_f/P$ schedule signal regulates the flow of fuel to the jet engine to establish the acceleration, deceleration and steady-state engine operating conditions, where $W_f$ is fuel flow in pounds per hour and P is compressor discharge pressure,
    said control system including an actuator,
    valve means including servo pressure and drain pressure for controlling said actuator by applying servo and drain pressure thereto,
    control means responsive to the revolutions per minute (r.p.m. of the compressor for controlling said valve means for effectuating movement of said bleeds to an opened and a closed position,
    said control means being operable to effectuate movement of said bleeds to an opened position at a first predetermined engine r.p.m.,
    and to a closed position at a second predetermined engine r.p.m. but higher than said first predetermined engine r.p.m.
    and to either an opened or closed position between said first and second predetermined engine r.p.m., but being opened above a predetermined percentage of said steady-state condition and prior to said acceleration and deceleration conditions.

* * * * *